Patented Nov. 17, 1953

2,659,854

UNITED STATES PATENT OFFICE 2,659,854

POWER SUPPLY UNIT FOR HIGH-SPEED FLASH

Arthur M. Wengel, Blooming Grove, Wis., assignor to Ray-O-Vac Company, Madison, Wis., a corporation of Wisconsin Application November 14, 1949, Serial No. 126,979

7 Claims. (Cl. 320—1)

This invention relates to high speed flash lamp equipments, and particularly to such equipments as are designed to be operated from small portable power sources such as dry cell batteries.

It is a principal object of the invention to provide a portable, self-contained unit, powered by either internal or external dry cell batteries and which provides a regulated high electrical potential for the energization of high intensity light sources, especially of the repeating gas-discharge type.

An additional object of the invention is to provide a self-contained unit of the above type which employs a voltage regulator tube of a type which produces a luminous discharge, the arrangement being such that this discharge may be observed so as to act as a signal indicating when the available potential is at a desired predetermined level suitable for operation of the external flashing light source.

Still another object of the invention is to provide a self-contained apparatus of the above type in which an interlock is provided to insure that any electric charge stored in the internal capacitance of the equipment will be discharged prior to opening of the case in order to prevent shock hazard to personnel.

Another object of the invention is to provide apparatus of the above type in which the operation of the device is conditioned upon the actual connection of its high voltage output to the external light source, in such a way that until a proper output connection has been established there will be no possibility of the operation of the high voltage generating portions of the equipment.

Figure 1:
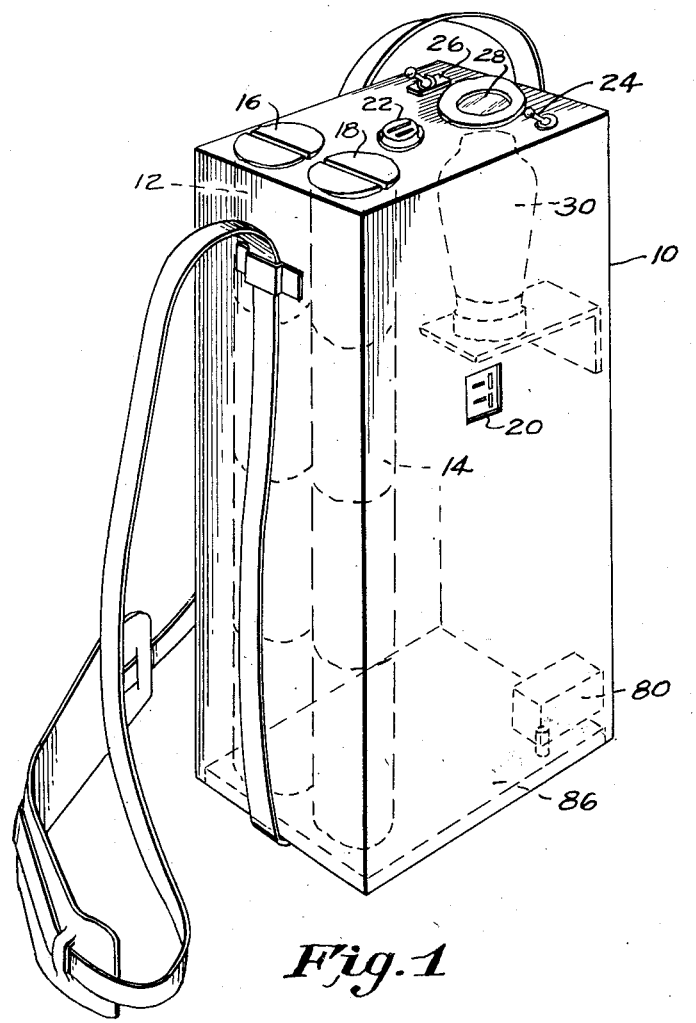
Figure 2:
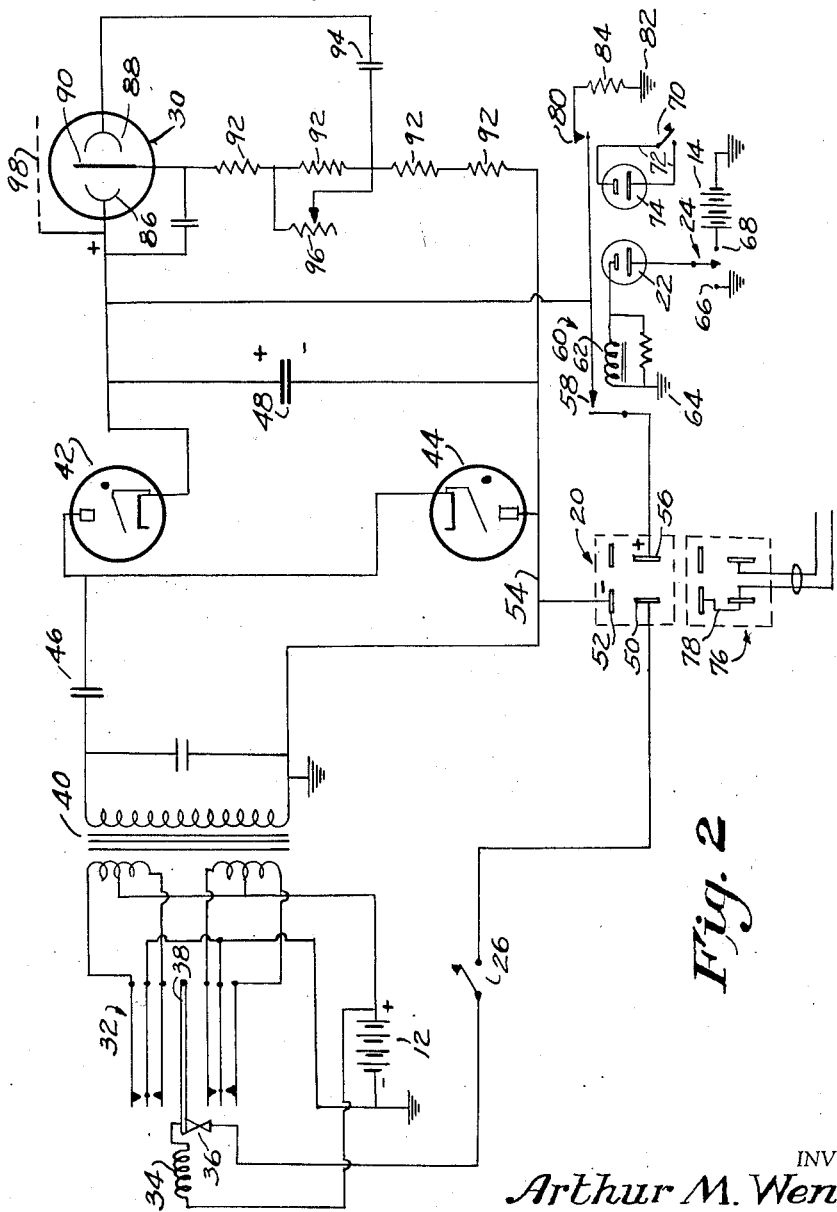

The above and other objects of the invention will best be understood by referring to the following detailed specification of a preferred embodiment thereof, reference being made to the accompanying drawing, in which:

Fig. 1 is a perspective view of a complete power supply apparatus in accordance with the invention, and Fig. 2 is a schematic wiring diagram of the circuit employed in such apparatus.

In a prior co-pending application, assigned to the assignee of this application, and identified as Serial Number 778,853, filed October 9, 1947, which has matured into Patent No. 2,495,301, I disclosed and claimed a circuit arrangement for the utilization of a cold cathode gas discharge tube as a voltage regulator for high intensity light source application. The present case is in part a continuation of that earlier application, and provides certain mechanical structures and certain additional electrical circuit features which greatly contribute to the efficient use of such apparatus.

Referring now more especially to Fig. 1 of the drawings, there is illustrated a high voltage power supply unit comprising a casing 10 provided with preferably tubular recesses or chambers in which are received two sets 12, 14 of dry cell batteries, for example sets of 4 ordinary size D flash light cells. These cells may be held in place by caps 16 and 18 which may conveniently be in threaded engagement with the casing 10, and suitable electrical contacts (not shown) are provided to convey the electric energy of such dry cells to the circuit components which will be described more in detail hereinafter. The high voltage output from this power unit is connected to an outlet socket 20 in one wall of casing 10, and a tripping cable socket 22 is provided to receive a plug which may be either the connection plug of an ordinary photo flash unit or the plug of a switch cable utilized when the device is to be controlled from one of the internal sets of dry cells 12 or 14. It will be understood that the actual connection of the high voltage generated within the unit to the output socket or receptacle 20 is accomplished by means of an internal relay to be described below, and that the control exercised through connections made to receptacle 22 is effected by control of the operating magnet of such a relay.

A switch 24 is provided preferably on the top of the casing 10 to condition the internal circuit for the control by internal or external batteries as described above, and a second switch 26 is utilized to control the connection of the other set of internal batteries which supply the energy to the high voltage generating circuit. Located in any convenient position on the casing 10, and as shown in Fig. 1 preferably on the upper surface of such casing, is an observation window 28, of transparent material such as glass or clear plastic, and through which the user may view the luminous condition of a voltage regulator tube 30 suitably secured in any desired manner beneath said window. The purpose of this arrangement is to enable the user to determine when the voltage attained by the high voltage supply has reached the desired predetermined value at which it is capable of operating the external gas discharge light source.

Referring now more particularly to the wiring diagram shown in Fig. 2 of the drawings, numeral 12 designates one set of the internal dry cells contained in the casing 10, the same being connected to drive a circuit interrupter such as a vibrator 32 of known type by energizing the operating coil 34 thereof through contacts 36 secured to a reed 38 under the magnetic influence of such coil. This vibrator unit operates in a known way to convert the direct current from battery 12 into a pulsating direct current which is then fed to the primary windings of a transformer 40 so designed as to provide an alternating output voltage of the order of magnitude required; this voltage may for example be of the order of 1350 volts of alternating current, but since it is an alternating voltage it must be converted to a direct voltage in order to be utilized to charge the storage capacitor of the apparatus. To this end, the alternating voltage output of transformer 40 is applied across a pair of grid-controlled rectifier tubes 42 and 44, connected with a capacitor 46 in a well known type of cascade voltage doubling circuit including the storage capacitor 48, which may for example be a 15 microfarad condenser having a peak voltage rating (such as 3000 volts) sufficient to enable it to withstand the high potential applied thereto from the transformer and voltage doubler rectifier combination.

One side of battery 12 is shown as connected to ground (which may be the metal chassis and/or casing 10 of the equipment), and the circuit to the driving coil 34 of the vibrator is completed through the on-off switch 26 and the terminals 50 and 52 of the high voltage output receptacle or socket 20, the last named terminal in turn being connected to ground as via lead 54. This same terminal 52 is also connected to one side of the storage capacitor 48, the other side of such storage capacitor being connected to a terminal 56 of receptacle 20 through the normally opened contacts 58 of a control relay 60 having an operating coil 62 one terminal of which is grounded at 64. The other terminal of the operating coil of the relay is connected through the two terminals of plug receptacle 22 to the blade or common contact of the single pole double throw switch 24, by means of which connection may be made either to ground as indicated at terminal 66 of this switch, for use when the batteries of an external flash unit are to be connected to receptacle 22 and thus to energize relay coil 62, or alternatively to the other terminal 68 of switch 24 which connects the relay coil in a series circuit with the other self-contained dry cell battery 14. With the switch 24 in this latter position, the connection of the high voltage storage capacitor to the output socket or receptacle 20 may be effected merely by temporarily shortcircuiting the terminals of receptacle 22, for example by the operation of a pushbutton 70 connected to a tripping cord or cable 72 carrying a plug 74 suitable for insertion in the receptacle 22.

It will be seen from the above description that while switch 26 is operative to control the connection of the dry cell battery 12 to the driving coil 34 of the vibrator, closure of this switch will be effective to complete the driving circuit only when a suitable output plug 76 is plugged into receptacle 20, this plug having the prongs corresponding to terminals 50 and 52 of the receptacle 20 permanently connected to one another as by a jumper 78. Thus, energization of the vibrator (with consequent depletion of battery 12) can only be accomplished when a properly arranged output cable is plugged into the receptacle 20, this feature preventing accidental waste of the energy contained in battery 12.

It will have been noticed that one side of the storage capacitor 48 is permanently connected to ground by lead 54; in order to prevent shocks to repair personnel and the like, a switch 80 of the normally closed type is utilized to connect the ungrounded side of storage capacitor 48 to ground as at 82 through a suitable resistance 84. This switch is shown in dotted lines in Fig. 1 as arranged to be maintained in "circuit-open" condition when the casing 10 is in place on the base plate 86 of the apparatus. Thus, whenever the casing 10 is removed to enable access to be had to the electrical components, switch 80 will automatically return to its circuit closed position and will operate to dissipate any charge on storage capacitor 48 through the resistor 84.

The voltage regulator portion of the apparatus in general follows the principles described in my prior application referred to above. As shown in Fig. 2, the cold cathodes 86 and 88 of the glow tube 30 are actually used as plate or anode electrodes, cathode 86 being connected to the positive side of storage capacitor 48 and anode or firing electrode 90 being connected through the 200,000 ohm resistors 92 to the negative side of said storage capacitor. The remaining cathode 88 of regulator tube 30 is connected through a capacitor 94 to a potentiometer or variable resistor 96 shunted across one of the resistors 92 to provide adjustment of the frequency of the relaxation oscillation for adjustment of the regulated voltage maintained across capacitor 48.

During the initial build-up of voltage across storage capacitor 48 there is no luminous output from regulator tube 30; however, as the storage capacitor voltage approaches the firing potential of regulator tube 30, said tube begins to fire, thus producing an intermittent luminous output. As the potential continues to rise, the firing frequency of regulator tube 30 also increases ultimately becoming so high that it appears as a continuous glow to the eye, and when this condition has been reached the operator knows that storage capacitor 48 has reached a voltage suitable for the operation of the gas discharge light source connected to the power supply through receptacle 20. At any time thereafter, energization of relay coil 62 by one of the means described above (internal battery 14 or an external flash gun connected to a plug suitable for insertion in socket 22), will discharge the storage capacitor through the external light source to produce the desired flash of high intensity and very short duration.

In my prior application referred to above, provision was made for partial ionization of the gas in the regulator glow tube, as by a capacitance connection to an adjacent circuit element, for example through a metallic washer cemented to the glass envelope of the glow tube. I have now found that ionization of the regulator glow tube may equally well be facilitated by the capacitance which inheres in the relationship between the glow tube and surrounding or adjacent circuit components. To increase the degree of control of this effect, I have found it desirable partially to shield the regulator tube 30 and to connect this shield to the positive lead to the regulator tube from the storage capacitor 48, as indicated in Fig. 2.

The shielding element is designated diagrammatically in that figure by numeral 98, and such shield may take the form of a layer of metallic foil surrounding a part of the glass envelope of the tube 30, being spaced from the tube and also secured thereto by means of an intervening layer of paraffin or similar material which lies between the glass envelope of the tube and the foil layer. When so constructed, the metallic foil shield may be connected by a short lead to that base pin of tube 30 which leads to the positive terminal of storage capacitor 48. In this way, the shield becomes an integral portion of tube 30 which makes for convenience when it is necessary to remove or replace such tube.

While I have shown the entire casing 10 as removable from the chassis and other components which are carried by a base plate 86, it will be understood that this is merely exemplary of many possible arrangements, and that the safety switch 80 may be made to function in the desired manner with all such arrangements by so locating it that its operating element is held in open-circuit condition at all times except when the casing is removed from the chassis.

The invention has been described herein in connection with a presently preferred embodiment thereof, but it is to be understood that many changes and modifications may be made in such embodiment without departing from the scope of the invention as defined in the appended claims.

I claim:

1. A self-contained high voltage power supply comprising a casing, a viewing aperture in said casing, means in said casing for receiving at least one dry cell battery, circuit elements for converting the voltage output of said battery to a high voltage direct current potential, and a discharge device for regulating the value of said potential, said discharge device comprising a glow tube located within said casing in position for observation through said viewing aperture.

2. The invention in accordance with claim 1 including an outlet connector for said potential, and means including said connector for interrupting the flow of current from said battery to said circuit elements except when an external connection is made to said connector.

3. The invention in accordance with claim 1 including a storage capacitor connected across the output of said circuit elements, access means for said casing, and switch means operably controlled by said access means for automatically discharging said storage capacitor.

4. The invention in accordance with claim 1 including an output connector for said potential, relay means for completing the circuit from said circuit elements to said connector, means for receiving in said casing at least one additional dry cell battery, a control cable socket having one terminal connected to a coil terminal of said relay means, and a switch for connecting another terminal of said socket selectively with said additional battery or with another coil terminal of said relay means.

5. The invention in accordance with claim 1, and a shield for said glow tube connected to the positive terminal of said high voltage direct current potential.

6. A portable, self-contained high voltage power supply for flash photography, comprising a casing, means in said casing for receiving at least one dry cell battery, circuit elements for converting the voltage output of said battery to a high voltage direct current potential, a discharge device for regulating the value of said potential, at least one switch located on one face of said casing and connected for controlling said circuit elements, and a viewing window in said face, said discharge device comprising a glow tube located within said casing in position for observation through said window.

7. The invention in accordance with claim 1, in which said glow tube has a glass envelope, and a metallic shield surrounding a part of said envelope and connected to the positive terminal of said high voltage direct current potential.

ARTHUR M. WENGEL.

References Cited in the file of this patent

UNITED STATES PATENTS

| Number | Name | Date |
|---|---|---|
| 2,358,796 | Edgerton | Sept. 26, 1944 |
| 2,447,832 | Abend | Aug. 24, 1948 |
| 2,450,153 | Moore | Sept. 28, 1948 |
| 2,464,188 | Spinks | Mar. 8, 1949 |
| 2,495,301 | Wengel | Jan. 24, 1950 |
| 2,513,396 | Beck | July 4, 1950 |
| 2,516,209 | Henninger | July 25, 1950 |